(12) United States Patent
Song

(10) Patent No.: US 11,529,954 B2
(45) Date of Patent: Dec. 20, 2022

(54) AFTER-TREATMENT REGENERATION SYSTEM AND METHOD UTILIZING NEUTRAL CONTROL

(71) Applicants: Hyundai Motor Company, Seoul (KR); KIA Motors Corporation, Seoul (KR)

(72) Inventor: Jae-Hyeok Song, Incheon (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 436 days.

(21) Appl. No.: 16/662,263

(22) Filed: Oct. 24, 2019

(65) Prior Publication Data

US 2020/0180629 A1 Jun. 11, 2020

(30) Foreign Application Priority Data

Dec. 11, 2018 (KR) ........................ 10-2018-0159368

(51) Int. Cl.
*B60W 30/18* (2012.01)
*B60W 10/06* (2006.01)
(Continued)

(52) U.S. Cl.
CPC ......... *B60W 30/18072* (2013.01); *B60K 6/26* (2013.01); *B60W 10/06* (2013.01); *B60W 10/10* (2013.01); *B60W 20/10* (2013.01); *B60K 2006/268* (2013.01); *B60W 2510/068* (2013.01); *B60W 2510/0638* (2013.01); *B60W 2520/10* (2013.01); *B60W 2540/10* (2013.01); *B60W 2554/801* (2020.02); *B60W 2554/804* (2020.02); *B60W 2710/0655* (2013.01); *B60Y 2200/92* (2013.01); *B60Y 2300/18066* (2013.01)

(58) Field of Classification Search
CPC .......... B60W 30/18072; B60W 10/06; B60W 10/10; B60W 20/10; B60W 2510/0638; B60W 2520/10; B60W 2540/10; B60W 2554/801; B60W 2554/804; B60W 2710/0655; B60K 6/26; B60K 2006/268; B60Y 2200/92; B60Y 2300/18066
See application file for complete search history.

(56) References Cited

U.S. PATENT DOCUMENTS

2007/0017215 A1\* 1/2007 Matheaus ............. F01N 3/2013
60/286
2008/0053074 A1\* 3/2008 Verkiel ................. B60W 10/06
60/295

(Continued)

FOREIGN PATENT DOCUMENTS

KR     20140009833 A   *  1/2014
WO     WO 2010/123787 A2   10/2010
WO     10-20140009833 A     1/2014

*Primary Examiner* — Marthe Y Marc-Coleman
(74) *Attorney, Agent, or Firm* — Lempia Summerfield Katz LLC

(57) ABSTRACT

A mild hybrid vehicle controlling method, wherein the mild hybrid vehicle has a driver assistance module for detecting peripheral vehicle information and a mild hybrid starter & generator (MSHG) may comprises comparing, by a controller, the peripheral vehicle information with a predetermined reference value and deciding whether after-treatment regeneration control is performed or not according to a result of the comparison.

9 Claims, 5 Drawing Sheets

(51) Int. Cl.
*B60W 10/10* (2012.01)
*B60K 6/26* (2007.10)
*B60W 20/10* (2016.01)

(56) References Cited

U.S. PATENT DOCUMENTS

2012/0036847 A1 2/2012 Schreiber et al.
2017/0021831 A1* 1/2017 De Smet ................ B60K 31/00

* cited by examiner

AFTER-TREATMENT REGENERATION SYSTEM AND METHOD UTILIZING NEUTRAL CONTROL

CROSS-REFERENCE TO RELATED APPLICATION

This application claims priority to and the benefit of Korean Patent Application No. 10-2018-0159368, filed on Dec. 11, 2018, which is incorporated herein by reference in its entirety.

FIELD

The present disclosure relate to a technique for after-treatment regeneration control utilizing neutral control.

BACKGROUND

The statements in this section merely provide background information related to the present disclosure and may not constitute prior art.

In general, the vehicle equipped with a diesel engine includes an after-treatment apparatus for treating the exhaust gas discharged after combustion. The after-treatment apparatus includes removing a particulate matter (PM) contained in the exhaust gas and removing a gaseous substance (NOx).

In addition, the after-treatment apparatus is performed either in a manner of collecting the exhaust gas discharged after combustion into a filter and then removing it or in a manner of converting the exhaust gas into another substance using a separate catalyst provided in the after-treatment apparatus and removing it.

In this case, the process of removing the substance collected in the filter at any moment in the after-treatment apparatus is referred to as "regeneration of filter". Examples of such a regeneration method include a method of using an electric burner and a method of using a catalyst.

However, in such a case, after-treatment regeneration may not be possible during operation at low-speed and low-load for a long time. That is, the failure rate of regeneration is high because a driver does not recognize the regeneration state even during normal driving.

In addition, if the regeneration of lean NOx traps (LNTs), DeNOx, DeSOx, or diesel (gasoline) particle filters (D(G)PFs) continues to fail, a number of complications may arise in terms of qualities relating to oil dilution, oil increase, DPF cracks, and so on.

Furthermore, existing after-treatment apparatus is expensive, and may not be efficiently utilized.

The above information disclosed in this Background section is only for enhancement of understanding of the background of the present disclosure, and therefore it may contain information that does not form the prior art that is already known to a person of ordinary skill in the art.

SUMMARY

A form of the present disclosure is directed to an after-treatment regeneration system and method utilizing neutral control, capable of inhibiting a deterioration of fuel efficiency and removing an after-treatment damage factor due to continuous regeneration entry and failure.

Another form of the present disclosure is directed to an after-treatment regeneration system and method utilizing neutral control, capable of improving controlling an exhaust temperature (i.e., an operating point) during regeneration for improving catalyst purification efficiency.

Another form of the present disclosure is directed to an after-treatment regeneration system and method utilizing neutral control, capable of increasing a success rate of after-treatment regeneration in combination of a driver assistance technique, a coasting neutral control technique, and so on.

Those skilled in the art to which the present disclosure pertains will appreciate that the present disclosure can be realized by the means as claimed and combinations thereof.

In accordance with a form of the present disclosure, there is provided an after-treatment regeneration system utilizing neutral control capable of inhibiting a deterioration of fuel efficiency and removing an after-treatment damage factor due to continuous regeneration entry and failure.

The after-treatment regeneration system may include a driver assistance module for detecting peripheral vehicle information, and a controller configured to compare the peripheral vehicle information with a predetermined reference value and to perform after-treatment regeneration control for independently driving an engine by entering a neutral control mode according to a result of the comparison.

The after-treatment regeneration control may be performed only for a coasting time, the coasting time may be calculated using the peripheral vehicle information from when a pedal is turned on to when the pedal is turned off.

The coasting time may be a value obtained by dividing an inter-vehicle distance by a relative speed in the peripheral vehicle information.

The neutral control mode may serve to shift a transmission from a drive range to a neutral range.

The after-treatment regeneration control may be a control for raising a current temperature of a catalytic filter to reach a temperature set in a predetermined regeneration request map.

The after-treatment regeneration control may be started from an operating point that is a point after a lapse of a certain time from a starting point of the costing time.

The operating point may be calculated using an amount of fuel and a current rotational speed of the engine.

The amount of fuel may be selected from a look-up table set by reflecting an exhaust temperature.

In accordance with another form of the present disclosure, there is provided a mild hybrid vehicle controlling method, wherein the mild hybrid vehicle has a driver assistance module for detecting peripheral vehicle information and a mild hybrid starter & generator (MSHG), comprising: comparing, by a controller, the peripheral vehicle information with a predetermined reference value to generate a comparison, and deciding, by the controller, whether after-treatment regeneration control is performed or not according to a result of the comparison.

The after-treatment regeneration control is performed only for a coasting time, the coasting time is calculated using the peripheral vehicle information from when a pedal is turned on to when the pedal is turned off.

Energy generated by driving the engine is used for power generation of the mild hybrid starter & generator (MSHG).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
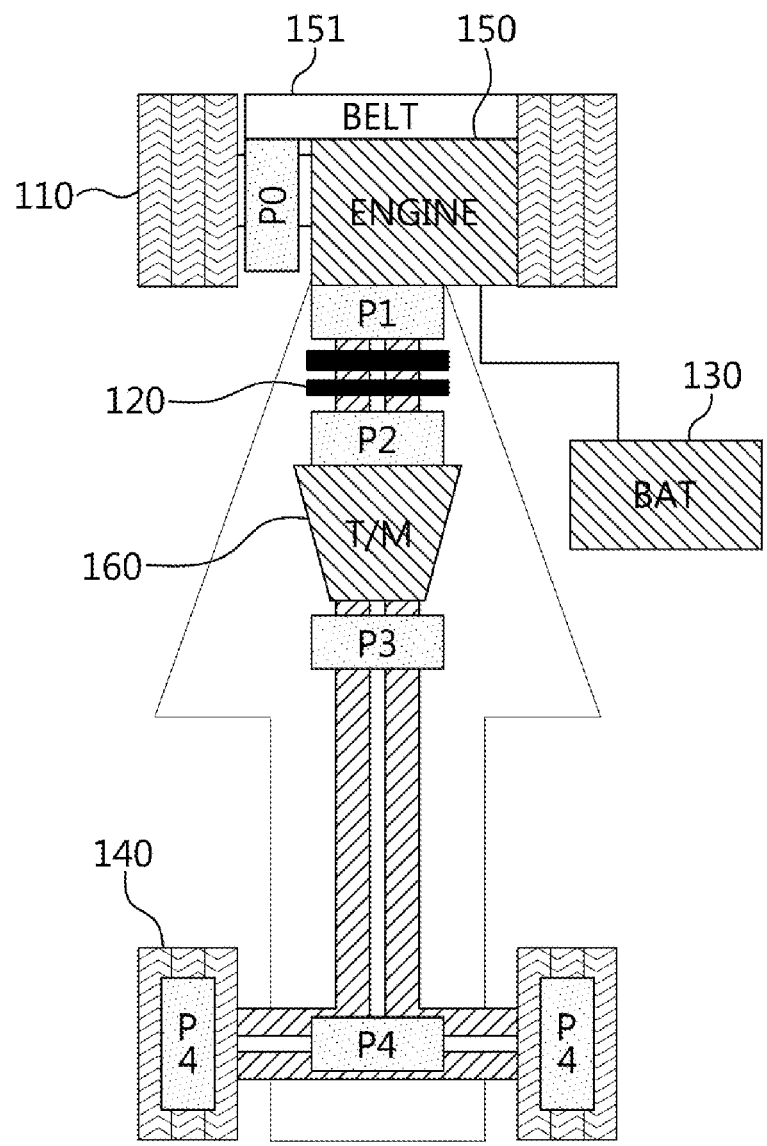
FIG. 1 is a conceptual diagram of a general eco-friendly vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described below in more detail with reference to the accompanying drawings. The present disclosure provides several different forms and should not be construed as limited to the forms set forth herein. Rather, these forms are provided so that this disclosure will be thorough and complete, and will convey the scope of the present disclosure to those skilled in the art. Therefore, it should be understood that the scope and spirit of the present disclosure can be extended to all variations, equivalents, and replacements in addition to the appended drawings of the present disclosure.

Throughout the disclosure, like reference numerals refer to like parts throughout the various figures and forms of the present disclosure. The terms including expressions, such as first and/or second, used in the specification of the present disclosure may be used to describe various elements of the present disclosure. However, the elements of the present disclosure should not be limited by the terms used in the specification of the present disclosure. In other words, such terms will be used only to differentiate one element from other elements of the present disclosure.

For example, without deviating from the scope and spirit of the present disclosure, a first element may be referred to as a second element, and, similarly, a second element may also be referred to as a first element. As used herein, the term "and/or" includes any and all combinations of one or more of the associated listed items.

Unless otherwise defined, all terms, including technical and scientific terms, used herein have the same meaning as commonly understood by one of ordinary skill in the art.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an after-treatment regeneration system and method utilizing neutral control according to forms of the present disclosure will be described in detail with reference to the accompanying drawings.

FIG. 1 is a conceptual diagram of a general eco-friendly vehicle 100. Referring to FIG. 1, the eco-friendly vehicle 100 may be a 48V mild hybrid electric vehicle (MEHV) and the system thereof is illustrated in the drawing. Reference numerals P0 to P4 denote positions where a motor is mounted. In the form of the present disclosure, the motor mounted on P1 is utilized. Of course, examples of the eco-friendly vehicle may include a hybrid electric vehicle (HEV) and a plug-in hybrid electric vehicle (PHEV).

The eco-friendly vehicle 100 includes wheels 110 and 140, a clutch 120, a 48V battery 130, an engine 150, a belt 151 directly connected to the engine 150, a transmission 160, and the like.

The engine 150 may be either a continuously variable valve timing (CVVT), a double over head camshaft (DOHC), a continuous valve timing (CAT), a gasoline direct injection (GAI), or a multi point injection engine (MPI) engine which uses gasoline as fuel, or a common rail direct injection (CRDI), a high direction turbo intercooler (HTI), or a variable geometry turbocharger (VGT) engine which uses diesel as fuel.

A starter/generator motor is positioned on P1 that is in the front of the engine 150 and the clutch 120, and can utilize the energy generated in the engine for power generation even when the clutch is not engaged. The starter/generator motor may be a mild hybrid starter & generator (MSHG). Energy generated by driving the engine 150 may be used for power generation of the mild hybrid starter & generator (MSHG).

Figure 2:
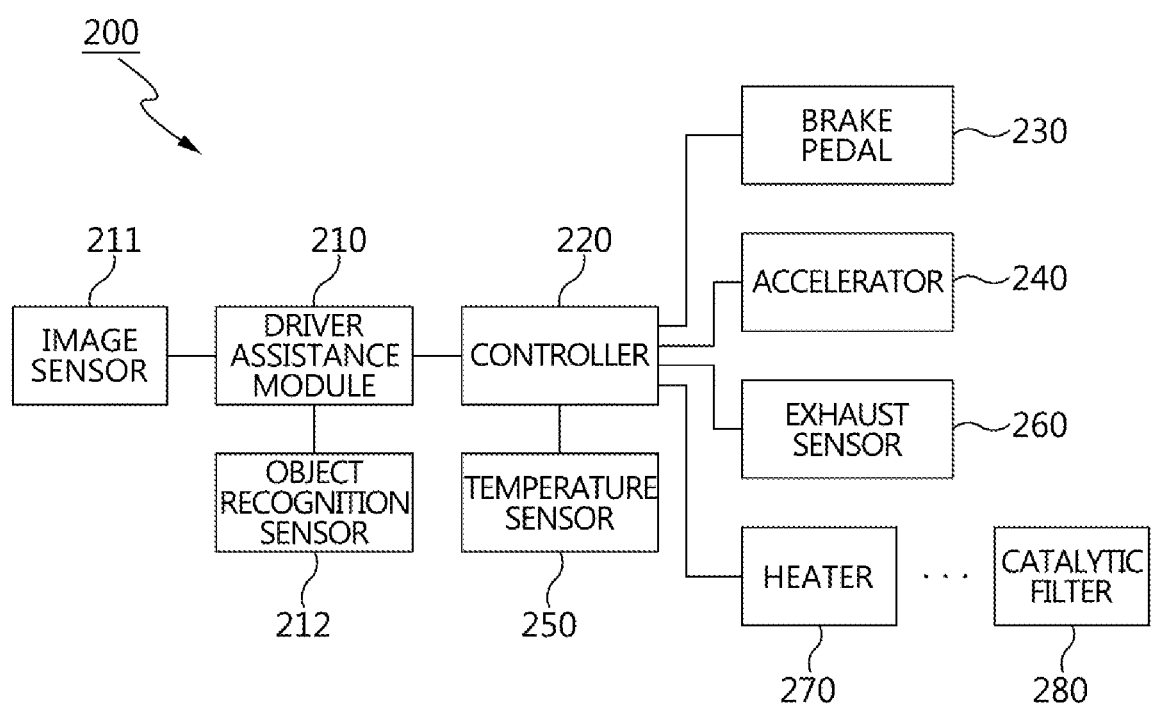
FIG. 2 is a block diagram illustrating an after-treatment regeneration system utilizing neutral control according to a form of the present disclosure.

FIG. 2 is a block diagram illustrating an after-treatment regeneration system utilizing neutral control 200 according to a form of the present disclosure. Referring to FIG. 2, the after-treatment regeneration system 200 may include a driver assistance module 210 for detecting peripheral vehicle information, a controller 220 for controlling after-treatment regeneration using the peripheral vehicle information, a brake pedal 230, an accelerator 240, a temperature sensor 250 installed at each of front and rear ends of a catalytic filter, an exhaust sensor 260 installed in an exhaust pipe (not shown) connected to the engine 150, and the like.

The drive assistance module 210 includes an image sensor 211 for generating image information of the peripheral vehicle information, an object recognition sensor 212 for generating information such as an inter-vehicle distance and a speed in the peripheral vehicle information, and the like. Examples of the inter-vehicle may include a complementary metal-oxide semiconductor (CMOS) camera and a charge-coupled device (CCD) camera. Examples of the object recognition sensor 212 may include a lidar and a radar. In particular, the driver assistance module 210 may be an advanced driver assistance system (ADAS). The ADAS performs various functions, for assisting a driver, such as forward collision avoidance assist (FCA) that warns the driver of danger and performs braking and steering alone in case of suddenly approaching a preceding vehicle or when there is a risk of collision with any pedestrian, lane keeping assist (LKA) that assists the vehicle in keeping the lane, backward collision avoidance assist (BCA) that notifies the driver whether another vehicle is in the rear blind spot that is not visible when the vehicle changes the lane, smart cruise control (SCC) that controls the distance from a preceding vehicle, and surround view monitor (SVM) that shows the surroundings with front and rear views, a top view, and the like at the time of parking and departure.

The controller 220 compares the peripheral vehicle information with a predetermined reference value, and performs after-treatment regeneration control for independently driving the engine according to the result of the comparison and whether or not to enter a neutral control mode. To this end, the controller may include a memory, a microprocessor, an electronic circuit, etc. for storing software, program, data, etc. for implementing an algorithm for comparing the peripheral vehicle information with a predetermined reference value and performing after-treatment regeneration control for independently driving the engine according to the result of the comparison and whether or not to enter a neutral control mode.

The memory may include at least one of storage media such as flash memory types, hard disk types, multimedia card micro types, card type memories (e.g., secure digital (SD) or extreme digital (XD) memories), random access memories (RAMs), static random access memories (SRAMs), read only memories (ROMs), electrically erasable programmable read only memories (EEPROMs), programmable read only memories (PROMs), magnetic disks, and optical disks.

The operation of the brake pedal 230 and the accelerator 240 is checked by an accelerator position sensor (APS) and a brake position sensor (BPS).

The temperature sensor 250 is installed at each of the front and rear ends of the catalytic filter 280 connected to the exhaust pipe (not shown) into which exhaust gas generated from the engine 150 is introduced, to detect the temperature of the catalyst.

The exhaust sensor 260 is installed at each of the exhaust pipe and the front and rear ends of the catalytic filter 280, to detect the type of exhaust gas, the amount of exhaust gas, and the like.

The heater 270 serves to heat the catalytic filter 280 to activate the catalyst. The heater 270 may be a positive temperature coefficient (PTC) heater using a PTC thermistor.

Figure 3:
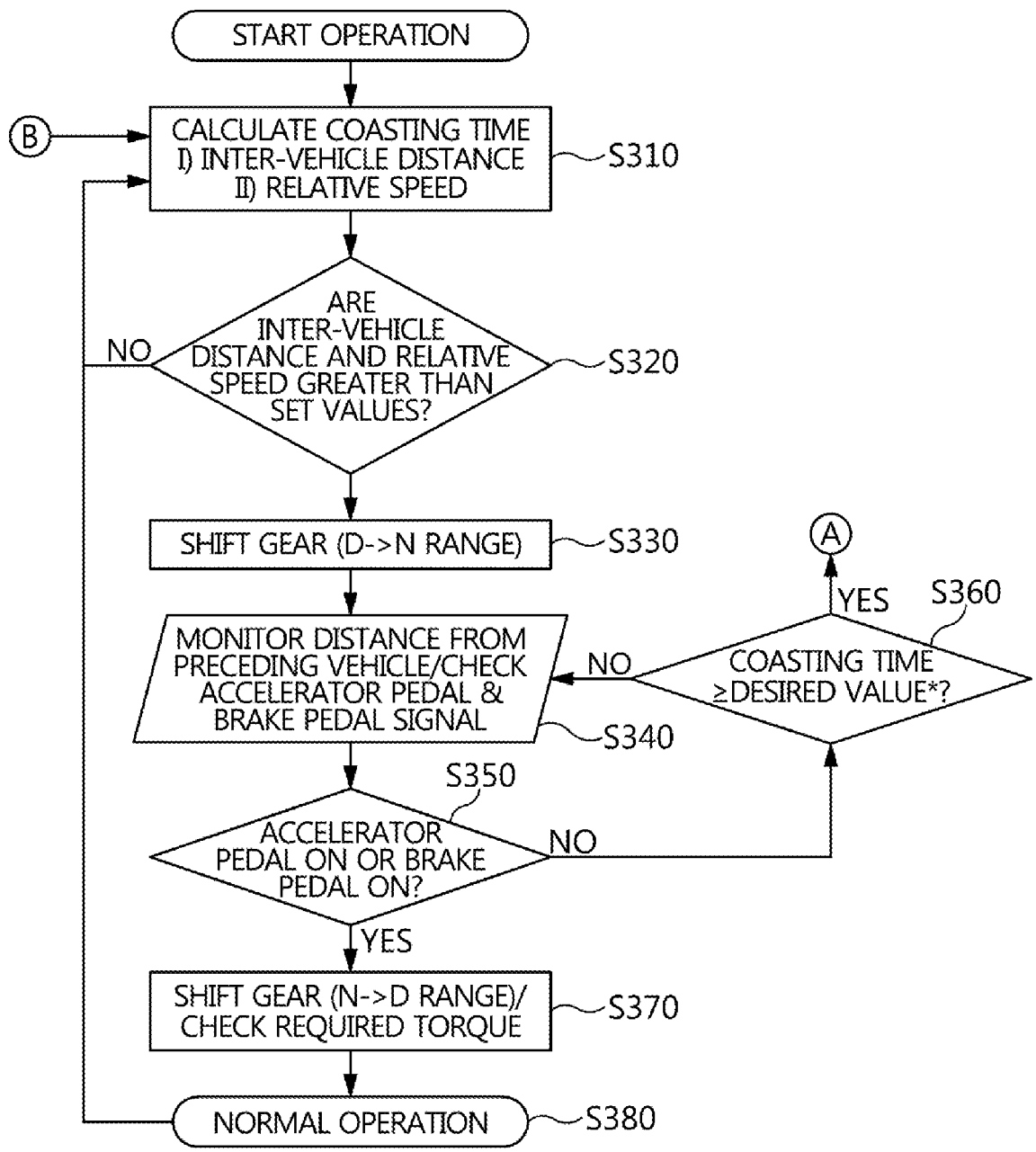
FIGS. 3 and 4 are flowcharts illustrating an after-treatment regeneration process utilizing neutral control according to a form of the present disclosure.
Figure 4:
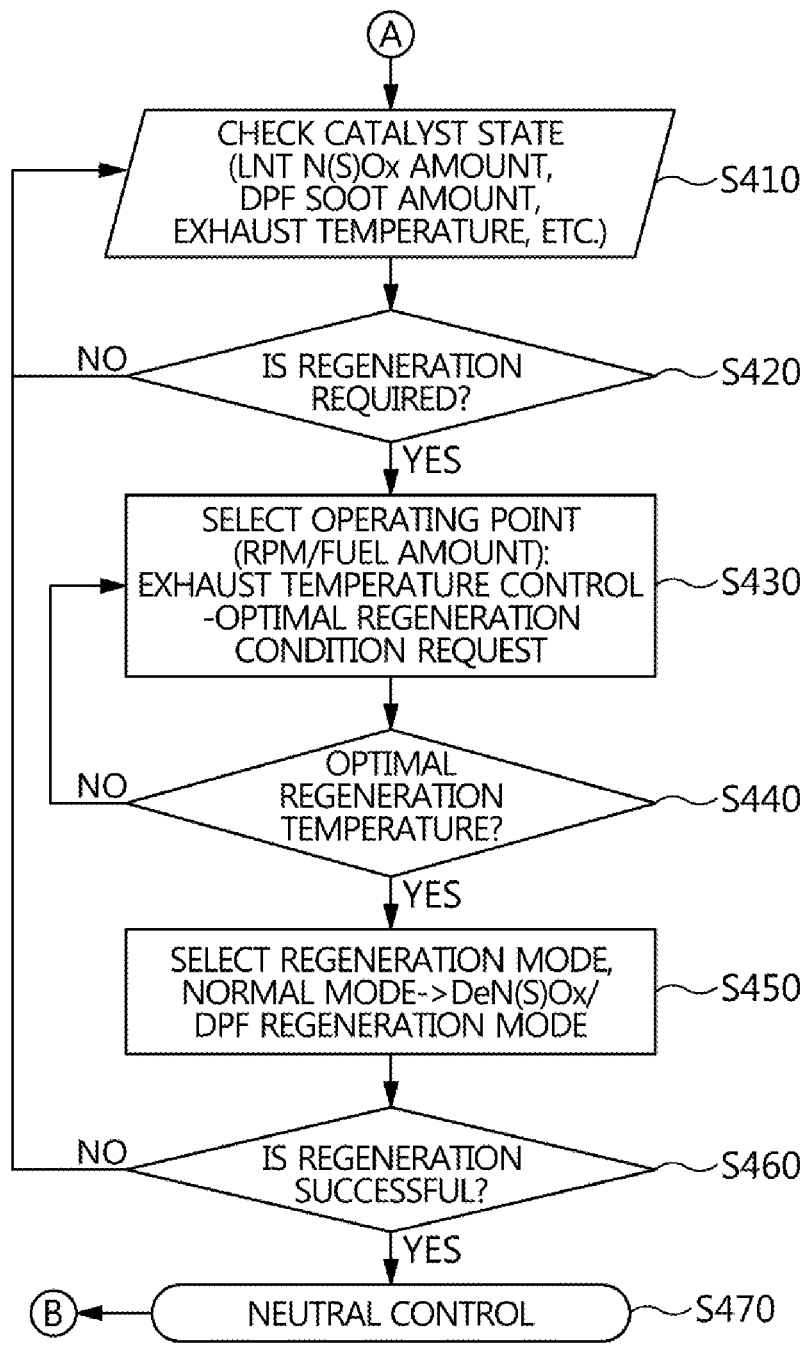

FIGS. 3 and 4 are flowcharts illustrating an after-treatment regeneration process utilizing neutral control according to a form of the present disclosure. Referring to FIGS. 3 and 4, when an operation mode is executed, the controller 220 obtains peripheral vehicle information from the driver assistance module 210 to calculate a coasting time (step S310). In other words, the coasting time refers to a time from when the accelerator is turned off to when the accelerator is turned on again.

That is, releasing the accelerator may be defined as accelerator OFF, whereas pressing the accelerator may be defined as accelerator ON. The vehicle may be operated through a smart cruise control system, but is not limited thereto. The SCC system is a system that automatically controls the speed of the vehicle so that the driver maintains the proper distance from a preceding vehicle without any additional operation.

The coasting time is inter-vehicle distance/relative speed. The inter-vehicle distance is a distance between a vehicle and a preceding vehicle. The relative speed refers to a relative velocity between two objects moving in an arbitrary direction. Therefore, when the inter-vehicle distance is 100 m and the relative speed is 10 m/sec, the costing time is about 10 seconds.

Next, the controller 220 determines whether the inter-vehicle distance is greater than a predetermined first set value or the relative speed is greater than a predetermined second set value (step S320). For example, the first set value may be 90 m and the second set value may be 9 m/sec.

When the inter-vehicle distance is greater than the predetermined first set value or the relative speed is greater than the predetermined second set value in S320, the controller 220 shifts the transmission 160 from a drive range (D) to a neutral range (N) (step S330).

Next, the controller 220 monitors the distance from the preceding vehicle and checks accelerator pedal and brake pedal signals (step S340).

Next, the controller 220 checks whether the accelerator pedal or the brake pedal is turned on (step S350). In other words, the controller checks whether there is the accelerator pedal or brake pedal signal.

Next, when the accelerator pedal or the brake pedal is turned on in S350, the controller 220 shifts the transmission 160 from the neutral range (N) to the drive range (D) and checks a desired torque for the accelerator pedal to perform normal operation (S370 and S380). Next, steps S310 to S370 are performed again.

On the other hand, when the accelerator pedal or the brake pedal is turned off in S350, the controller 220 determines whether the calculated coasting time is a predetermined desired value or more (step S360). As the desired value, the regeneration control time is about 5 seconds for the lean NOx trap (LNT) DeNOx, and the regeneration control time is about 20 seconds for the LNT DeNOx or DPF.

Next, when the coasting time is less than the predetermined desired value in S360, the process proceeds to step S340.

On the other hand, when the coasting time is the predetermined desired value or more in S360, the catalyst state is checked (step S410). In other words, the catalyst state is checked using exhaust information such as an accumulated amount of exhaust gas (NOx, SOx), an amount of diesel particulate filter (DPF) soot (an amount of fine dust collected in the filter), and an exhaust temperature.

Next, the controller 220 determines whether to execute the after-treatment regeneration control (step S420). In other words, the controller checks the catalyst state using the exhaust information and checks whether the catalyst state is appropriate. To this end, a regeneration request map in the form of a look-up table is provided. The regeneration request map consists of an accumulated amount of N(S)Ox, an amount of DPF soot, an exhaust temperature, and a catalyst temperature corresponding thereto, and the current detected catalyst temperature is compared with a reference catalyst temperature.

For example, when the accumulated amount of NOx is about 5 g or more and the amount of DPF soot calculated by the differential pressure model is 15 g or more, it is determined that the after-treatment regeneration is desired (step S420). Of course, the regeneration request map may also be provided for each LNT and DPF.

Next, when the after-treatment regeneration is desired, the controller 220 selects an operating point to perform the after-treatment regeneration (step S430). The operating point is calculated from the look-up table defined by the relationship between the current engine rotational speed (rpm) and the amount of fuel. In other words, the table is configured in which the current engine rotational speed is disposed on the X axis, the amount of fuel is disposed on the Y axis, and the operating point is disposed to match the engine rotational speed and the amount of fuel. Of course, the operating point may also be calculated only by current engine rotational speed (rpm)/amount of fuel.

The operating point is selected as a point when the after-treatment regeneration is actually started. For example, the operating point may be about 3 seconds from the starting point of the costing time. The amount of fuel is selected by reflecting the exhaust temperature. In other words, a predetermined look-up table is configured in which the amount of fuel is mapped with the exhaust temperature.

When a suitable regeneration temperature is calculated, a regeneration mode is selected (steps S440 and S450). A certain temperature (e.g., 200° C. or more) is desired to activate the catalyst, and the after-treatment regeneration is performed in a state in which the above temperature is maintained.

The after-treatment regeneration is performed by selecting a DeN(S)Ox regeneration mode or a DPF regeneration mode from the normal mode. When the regeneration is successful, the mode enters a neutral control mode (steps S460 and S470).

Figure 5:
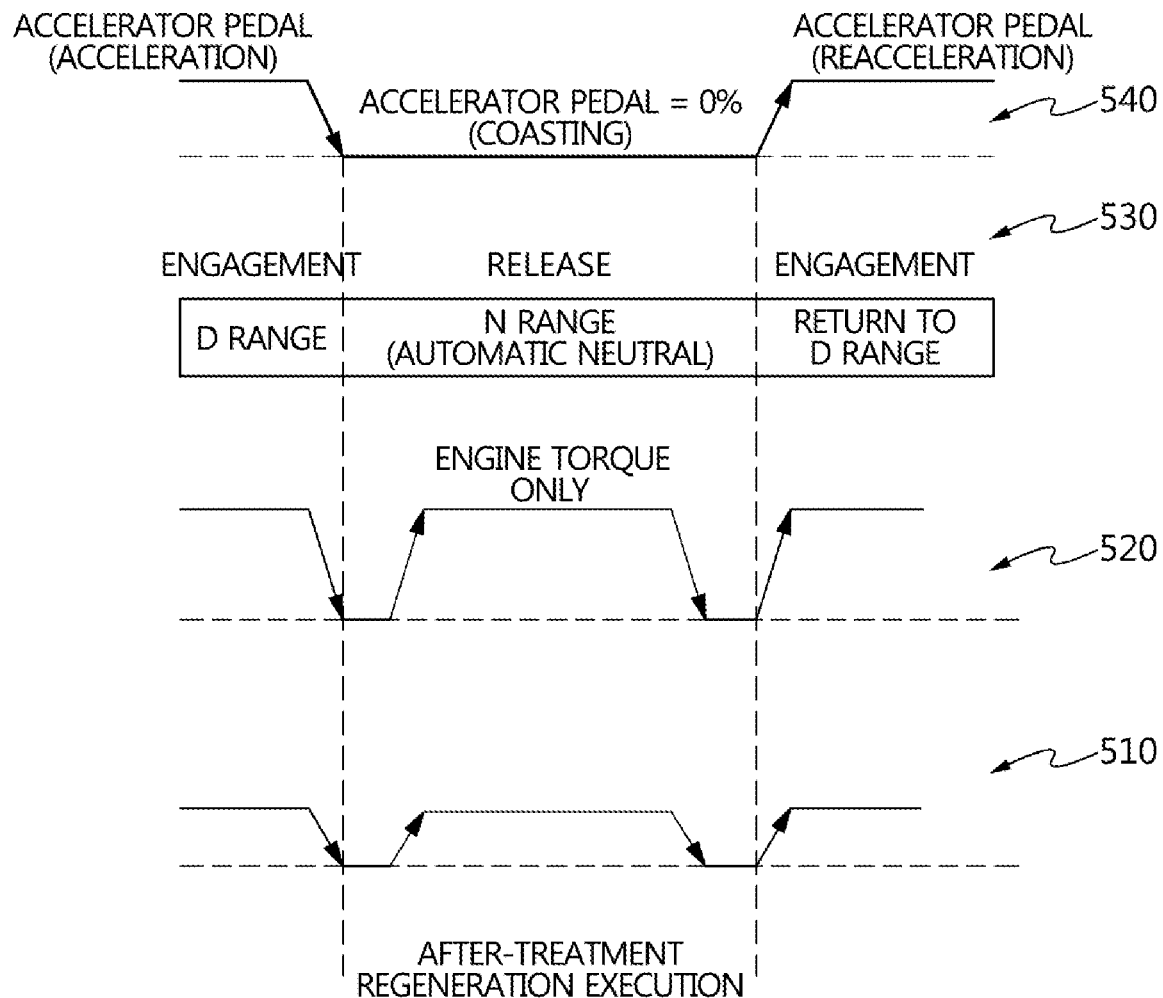
FIG. 5 is a time sequence diagram illustrating a shift clutch control according to the degree of opening of an accelerator according to a form of the present disclosure.

FIG. 5 is a time sequence diagram illustrating a shift clutch control according to the degree of opening of an accelerator according to a form of the present disclosure. FIG. 5 illustrates an accelerator pedal ON/OFF curve 540, a speed change curve by transmission 530, an engine torque curve 520, a motor power generation curve 510, and so on.

Referring to FIG. 5, in the section from when the accelerator pedal is turned off to when the accelerator pedal is turned on again (i.e., reacceleration), the transmission is in the N range, in which case the engine is not driven originally but it is forcibly driven for a coasting time.

In the neutral control mode, the energy generated from the engine is not transmitted to the wheels even though the engine is driven. That is, 100% after-treatment regeneration is possible. Particularly, the power generated by the starter/generator motor (P1 of FIG. 1) is fully stored in the battery 130 for the coasting time.

In particular, the after-treatment regeneration is started at regular intervals from the point where the operating point is "0".

In addition, a coasting function that improves fuel efficiency is activated when the driving distance is above a certain level. In other words, when the inter-vehicle distance is greater than a predetermined set value, the costing time is between about 2 seconds and 7 seconds. In addition, a hysteresis is applied for a certain period of time in order to inhibit frequent gear shifting at the coasting time. For example, even when the gear is shifted, the neutral range (N) is maintained for about 0.2 seconds after the lapse of 6 seconds.

In accordance with some forms of the present disclosure, it is possible to inhibit a deterioration in catalyst efficiency even when the excessive occlusion of NOx and SOx occurs in the lean NOx trap and/or the excessive accumulation of soot occurs in the diesel (gasoline) particle filter (D(G)PF) due to continuous regeneration failure or increase in non-regeneration period.

In addition, it is possible to control the exhaust temperature (the operating point) during regeneration for improving catalyst purification efficiency.

Furthermore, it is possible to increase the success rate of after-treatment regeneration in combination of a driver assistance technique, a coasting neutral control technique, and so on.

The steps of the method or algorithm described in connection with the forms disclosed herein may be implemented in the form of program commands executable by various computer means and recorded in a computer readable medium. The computer readable medium may include a program (command) cord, a data file, a data structure, or the like alone or in combination.

The program (command) cord recorded on the medium may be specially designed and configured for the present disclosure, or may be known to those skilled in the computer software for use. Examples of the computer readable medium may include magnetic media such as hard disks, floppy disks, or magnetic tapes, optical media such as CD-ROMs, DVDs, Blu-ray, and semiconductor memory devices, such as ROMs, RAMs, or flash memories, which are specifically configured to store and perform a program (command) cord.

Here, examples of the program (command) cord include a machine language code prepared by a compiler and a high-class language code executable by a computer using an interpreter, or the like. The hardware devices described above may be configured to operate as one or more software modules to perform the operation of the present disclosure, and vice versa.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A mild hybrid vehicle controlling method, wherein the mild hybrid vehicle has a driver assistance module for detecting peripheral vehicle information, including a distance from a preceding vehicle and a relative speed between the mild hybrid vehicle and the preceding vehicle, and a mild hybrid starter & generator (MSHG), the method comprising the steps of:
   comparing, by a controller, the peripheral vehicle information, including the distance from the preceding vehicle and the relative speed between the mild hybrid vehicle and the preceding vehicle, with a predetermined reference value, and
   deciding, by the controller, whether after-treatment regeneration control is performed or not according to a result of the step of comparing,
   wherein the after-treatment regeneration control is performed only for a coasting time, the coasting time being calculated using the peripheral vehicle information from when a pedal is turned on to when the pedal is turned off.

2. The mild hybrid vehicle controlling method of claim 1, wherein the coasting time is a value obtained by dividing an inter-vehicle distance by a relative speed in the peripheral vehicle information.

3. A mild hybrid vehicle controlling method, wherein the mild hybrid vehicle has a driver assistance module for detecting peripheral vehicle information, including a distance from a preceding vehicle and a relative speed between the mild hybrid vehicle and the preceding vehicle, and a mild hybrid starter & generator (MSHG), the method comprising the steps of:
   comparing, by a controller, the peripheral vehicle information, including the distance from the preceding vehicle and the relative speed between the mild hybrid vehicle and the preceding vehicle, with a predetermined reference value, and
   deciding, by the controller, whether after-treatment regeneration control is performed or not according to a result of the step of comparing,
   wherein the after-treatment regeneration control is performed for independently driving an engine by entering a neutral control mode.

4. The mild hybrid vehicle controlling method of claim 3, wherein energy generated by driving the engine is used for power generation of the MSHG.

5. The mild hybrid vehicle controlling method of claim 3, wherein the neutral control mode serves to shift a transmission from a drive range to a neutral range.

6. The mild hybrid vehicle controlling method of claim 5, wherein the after-treatment regeneration control is a control for raising a current temperature of a catalytic filter to reach a temperature set in a predetermined regeneration request map.

7. The mild hybrid vehicle controlling method of claim 6, wherein the after-treatment regeneration control is started from an operating point that is a point after a lapse of a certain time from a starting point of a coasting time.

8. The mild hybrid vehicle controlling method of claim 7, wherein the operating point is calculated using an amount of fuel and a current rotational speed of the engine.

9. The mild hybrid vehicle controlling method of claim 8, wherein the amount of fuel is selected from a look-up table set by reflecting an exhaust temperature.

\* \* \* \* \*